Figure 1:
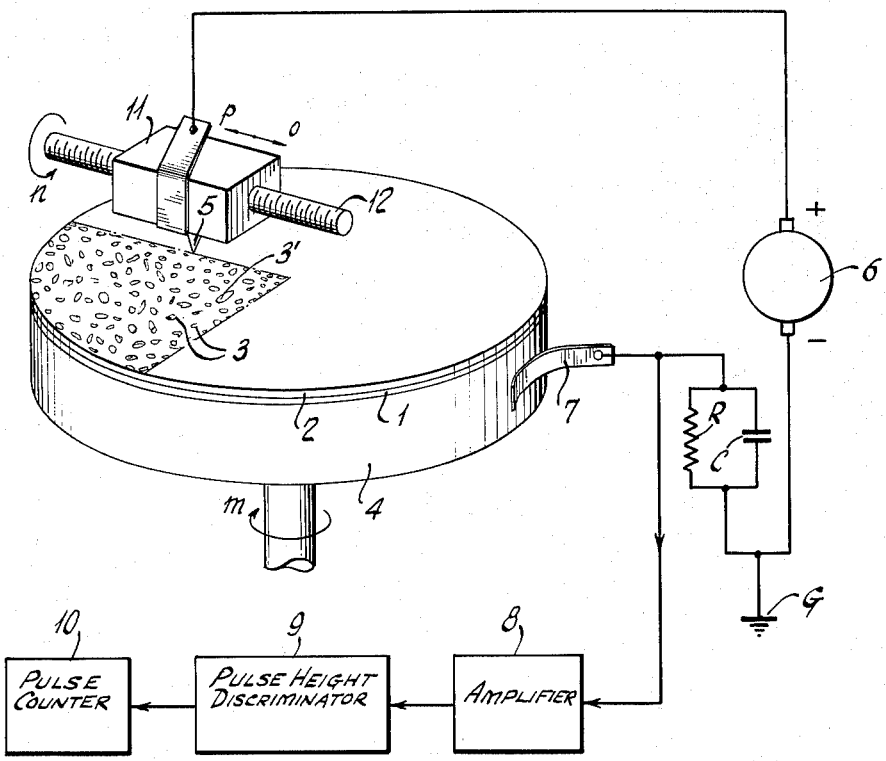

Dec. 21, 1965 H. ROTH 3,225,296
APPARATUS FOR ELECTRONICALLY ANALYSING PARTICLE AGGREGATES
BY SCANNING A MOSAIC CAPACITOR AND COUNTING AND
DISCRIMINATING PULSES RESPONSIVE
TO MOSAIC ELECTRODES
Filed March 28, 1962 2 Sheets-Sheet 1

INVENTOR.
HEINZ ROTH

BY

ATTORNEY

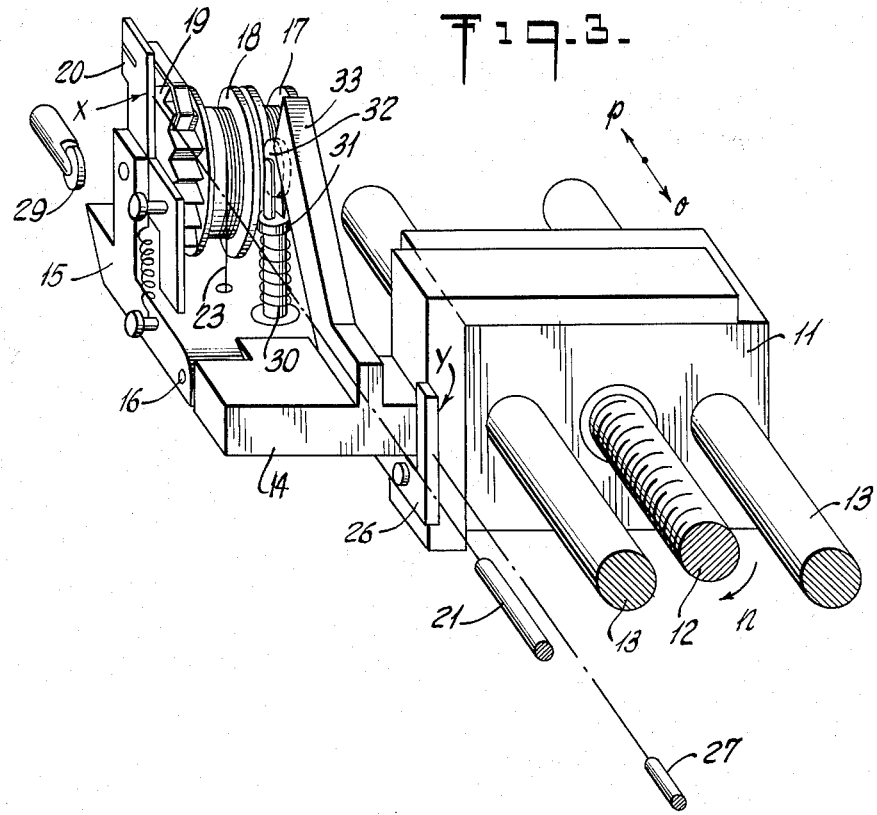
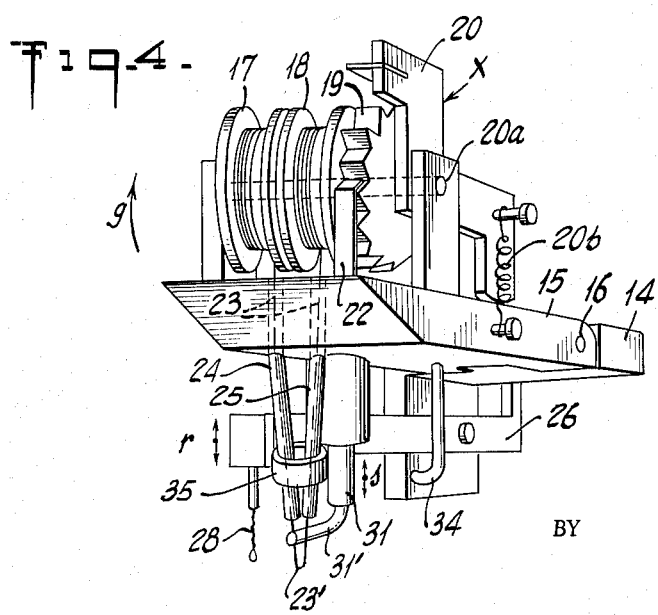

United States Patent Office 3,225,296
Patented Dec. 21, 1965

3,225,296
APPARATUS FOR ELECTRONICALLY ANALYSING PARTICLE AGGREGATES BY SCANNING A MOSAIC CAPACITOR AND COUNTING AND DISCRIMINATING PULSES RESPONSIVE TO MOSAIC ELECTRODES
Heinz Roth, Neuenhof, Switzerland, assignor to Aktiengesellschaft Brown, Boveri & Cie., Baden, Switzerland
Filed Mar. 28, 1962, Ser. No. 183,186
Claims priority, application Switzerland, Mar. 30, 1961, 3,855/61; Feb. 6, 1962, 1,433/62
9 Claims. (Cl. 324—61)

In science and technology it is frequently necessary to determine the number and size of particles, such as, for instance, for the recording of the statistical distribution curve of a particle aggregate. Examples of practical applications are dust analysis, solid body analysis of combustion gases, the determination of the grain size distribution of pulverous substances, where the sizing test by screen analysis no longer provides any reliable results, grain size and distribution analysis of photographic emulsions, drop size analysis in spray diffusers or wet vapors, blood analysis and numerous other uses and applications.

The direct measurement and counting of the particles, for instance, under the microscope, is extremely cumbersome and time consuming. Furthermore, in many instances the direct measurement is unfeasible, since a specimen of the particle aggregate to be analysed cannot be prepared. It is customary, therefore, to carry out the statistical evaluation by the use of a photographic image of the particle aggregate to be analysed. For this purpose, use is made of a microphotograph or photographic enlargement showing the individual particles on a scale sufficient to afford a measurement with adequate accuracy.

Furthermore, methods and apparatus have become known for automatically evaluating a photographic image of a particle aggregate based upon the optical analysis of the particle images by means of a scanning light beam. The intensity fluctuations of the scanning beam passing through or being reflected by the photographic image are converted by means of a photoelectric cell into electrical impulses, the latter being in turn sorted as to magnitude in an impulse height discriminator and the sorted pulses applied to an electronic counting device. These known analysing methods and devices have the drawback of requiring complex storage devices in order to avoid multiple counts of a single particle. This, in turn, makes it necessary to maintain an extremely high constancy of the scanning speed in the interest of ensuring the effectiveness of the storage devices. Furthermore, despite a considerable amount of electronic and mechanical devices and parts required, accurate results may be obtained practically only with circular particles by the use of the known scanning devices or particle aggregate analysers. Moreover, branched, concave or the like irregular particles will result in counting errors. In the case of needle-shaped or rod-shaped particles, although accurate counting may be feasible, the evaluation as best provides a statistical mean or average value, inasmuch as the position of the particle images relative to the scanning direction enters into the final determination or evaluation.

Furthermore, methods have become known according to which a photographic image of a particle aggregate is projected upon the mosaic screen of a television tube and scanned by the electron beam of the tube. This method is subject to the same drawbacks as those mentioned hereinabove.

Accordingly, an important object of the present invention is the provision of an improved method of analysing or evaluating a particle aggregate available in the form of a photomicrograph or the like image, such as for the sorting of the particles as to size and counting of the sorted particles, by which the foregoing and related drawbacks and difficulties of the previously known methods are substantially overcome or minimized.

Another object of the invention is the provision of apparatus designed for carrying into effect a particle analysis based on and utilizing the novel method according to the invention.

Among the further objects of the invention is the provision of a novel method of and apparatus for particle analysis of the type referred to which is both simple and economical in design and construction; which will be easy and reliable in use and operation; and which will result in reduced size and bulk of the analyser apparatus compared with similar devices heretofore known and used in the art.

Figure 2A:
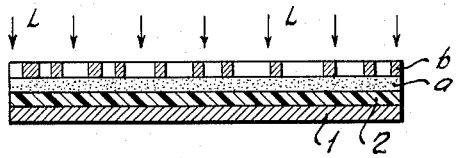
Figure 2B:
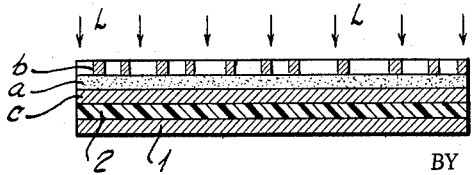

The invention, both as to its ancillary objects and novel aspects, will be better understood from the following detailed description of a preferred practical embodiment, taken in conjunction with the accompanying drawings forming part of this specification and in which:

FIG. 1 diagrammatically illustrates a preferred scanning system for analysing a particle aggregate in accordance with the basic concept and principle of the invention;

FIGS. 2A and 2B illustrate alternative methods of preparing an image capacitor from a photographic image of a particle aggregate to be analysed by means of apparatus according to FIG. 1; and FIGS. 3 and 4 are diagrammatic prespective front and rear views, respectively, showing in greater detail the scanning head or unit of the preferred particle aggregates analyser shown by FIG. 1.

Like reference characters denote like parts and elements in the different views of the drawings.

With the foregoing objects in view, the invention involves generally the preparation and utilization of an image or mosaic capacitor being comprised of a conducting base electrode, an intermediate insulating or dielectric layer and a multiplicity of discrete top layers or elemental conducting areas conforming to or forming a replica of the particle aggregate to be analyzed. In other words, the images of the particles are represented by conducting surfaces or partial areas forming discrete capacitor elements with a common base electrode, in a manner as will become further apparent from the following. In carrying out the invention, the partial elemental capacities of the mosaic capacitor are charged successively or step-by-step by a constant voltage source and the ensuing charging current pulses are evaluated such as by sorting as to size or area and counting of the sorted pulses.

The charging current of the partial capacitors has the shape of a pulse series with the height of the pulses being independent of the geometrical form of the area of the particle images. Since the charge assumed by a partial capacitor, provided the use of a constant charging voltage, is proportional to its electrical capacity, and since, furthermore, the latter with uniform thickness of the insulating layer is, in turn, proportional in a close approximation to the area representing a particle image, it is possible in this manner to utilize the pulse height of the charging currents as a measure of the particle size or area. In other words, the particle size may be represented by the area of the particle image which, in the case of particles of complex geometrical shape, is the only measuring magnitude of practical interest and value. For particles having a uniform and simple geometrical shape, the linear dimension can be determined from this magnitude without difficulty. Only particles which touch or overlap each other in the photographic image so as to coalesce into a multiple particle structure or lattice, cannot be analysed as single particles or units, as is the case with other analysing methods of this type known in the prior art.

After a partial capacitor has been charged to said voltage, its charge will be retained, in such a manner that during subsequent multiple scanning of the same particle no new charging pulse will be produced, whereby to eliminate the possibility of any multiple counting of the same particles. It is understood, of course, that the intermediate layer should consist of a highly insulating substance to prevent leakage of the charge between a first and subsequent scanning of the same partial elemental capacitor.

The image cacacitors for use in connection with the invention may be prepared by the use of methods and techniques well known per se. If the available photographic image of the particle aggregate to be analysed has too low a contrast, it may at first be copied upon a high-contrast film having an extremely steep gradation curve. From this high-contrast image there is then prepared photographically or in any other way a capacitative image or replica of the type described herein, wherein the images of the particles of the aggregate to be analysed are represented by electrically conducting areas of the mosaic capacitor. As an example, the photographic image may be copied upon a polystyrol film which has been coated with a water-soluble light sensitive layer, whereby said layer at the areas not covered by the particle images and exposed by the copying light rays will be hardened or have their solubility decreased. The areas corresponding to the particle images are then removed by rinsing, whereupon the layer is coated with a liquid containing a current conducting substance and subjected to a further rinse, to cause the conducting substance to adhere to the non-hardened areas which correspond to the images of the original particle aggregate. An electrically conducting copy of the particle aggregate may also be prepared by use of a well-known off-set printing process. Finally, a stencil corresponding to the photographic original may be produced by means of a well-known photographic etching process and utilized to spray an insulating carrier by means of a metallic emulsion, for instance a silver solution, or by a metal evaporation process in a vacuum, to result in an electrically conducting image of the original particle aggregate. By the same method, the conducting base may be applied to the insulating carrier or intermediate layer of the mosaic capacitor. An electrical replica of the particle aggregate to be analysed of the type described may furthermore be produced by the use of any of the photographic or the like etching processes or techniques known from the fabrication of printed electrical circuits and the like devices.

The intermediate layer of the image capacitor may consist of a plastic foil, oxide coating, or may be in the form of a glass film or plate having a high insulation resistance or dielectric constant. In practice, polystyrol or polymethylmetaacrylate, known under the tradename of "Plexiglas" have been found to provide satisfactory results.

Apparatus for carrying into effect the invention may comprise a scanning electrode connected to one pole of a direct current voltage source and being moved relative to the image capacitor, with the remaining pole of the source being connected to the base layer of said capacitor. Furthermore, suitable circuit means may be inserted in the scanning circuit to determine the charging pulse height and to count the pulses, as will be further understood from the following. According to a preferred embodiment, the mosaic capacitor is rotated continuously, while the scanning electrode is displaced radially in synchronism therewith, to result in a spiral scanning of the conducting areas representing the particle aggregate to be analysed. As will be understood, however, any other scanning method suggesting itself to those skilled in the art, such as line-by-line scanning, may be employed for the purpose of carrying into effect the invention.

Referring more particularly to FIG. 1 of the drawings, there is shown a circular mosaic capacitor being comprised of a base electrode 1, an intermediate insulating or dielectric layer 2 and a multiplicity of discrete top layers 3 or conducting areas conforming to or forming a replica of the particle aggregate to be investigated or analysed. The base electrode 1 is suitably mounted upon or secured to a metallic support or disk 4, such as by clamping, suction etc., to effect electrical and mechanical connection between the electrode 1 and said disk. The scanning electrode 5 consisting of a sliding wire may be either in conductive contact with the partial layers 3 or the electrode in the form of a stylus may be spaced by a slight constant distance from the image electrodes. The scanning electrode 5 is connected with one pole of a direct current source 6, while the disk 4 and with it the electrode 1 is connected with the remaining pole of the source through a sliding contact 7, in the example shown, or in any other suitable manner. Inserted in series with the scanning circuit is a parallel network comprising a capacitor C and a resistor R, the common point between the R-C circuit and the source 6 being advantageously grounded, as shown at G in the drawing. As is understood, the disk 4 should be insulated from ground.

A consecutive or step-by-step charging of the elemental capacitors formed by the partial images 3 and the electrode 1 by way of the electrode 5 may be achieved by a movement of the electrode 5 relative to the disk 4, such as by a line-by-line scanning arrangement by moving the electrode 5 in one direction and moving the disk or support 4 in a coordinate such as transverse direction to said first direction. The spiral scanning arrangement according to FIG. 1 has, however, been found to be of special advantage in carrying into effect the present invention. For this purpose, the disk 4 is rotated as indicated by the arrow $m$ by an electric driving motor, while the electrode 5 is displaced radially in both directions, as indicated by the arrows $p$ and $o$ in the drawing. According to a simple embodiment, the electrode 5 may be supported by a traveling nut 11 being displaced in the radial direction by means of a feed screw 12 rotated in synchronism with the disk 4 as indicated by the arrow $n$, in a manner readily understood.

The displacement of the electrode 5 during a single revolution of the disk 4 is adapted to the size or area of the smallest particle to be scanned by the proper choice of the rotating speeds of said disk and screw 12, respectively. If the decrease of the peripheral speed of the disk towards the center is undesirable, it may be compensated by the provision of an automatic speed control of the driving motor, such as in the form of a rotary potentiometer connected in the field circuit of the motor and synchronized with the displacement of the electrode 5, as is customary in connection with photographic and the like recording devices.

In order to cause the height of the current pulses during charging of the partial capacitors to vary in proportion to the capacities, a capacitor C is connected in series with the source and the image capacities being scanned, having a sufficiently high capacitance compared with the capacity of the largest partial mosaic capacitor. As a result, errors caused by the capacitance of the connecting leads may be substantially eliminated. The resistance R connected in parallel to the capacitor serves to reduce the decay time of the pulses to an extent as to cause the capacitor C to be fully discharged before the occurence of the next charging pulse. Furthermore, the resistance R serves to suppress oscillations in the circuit excited by the current pulses.

After scanning of the entire surface of the image capacitor, all the partial capacitors representing the particle aggregate will be charged to the potential of the source 6. In order to afford a renewed operation it is necessary to discharge the partial capacitors. This is effected advantageously during the return movement of the scanning electrode 5 by connecting the same to ground G, while reversing the rotation of the feed screw 12.

The current pulses produced by the consecutive charging of the partial image capacitors are applied, in the example shown, by way of a pulse amplifier 8 to a pulse height discriminator 9 and from there to a pulse recorder or electronic pulse counter, or any other analysing, indicating, or recording instrument. Such devices are well known per se in connection with the analysing of particle aggregates and do not form any part of the present invention. Furthermore, for the same reason conventional auxiliary devices have been omitted from the drawings, such as the driving means for the disk 4 and feed screw 12, the switches for the reversal of the scanning direction or the polarity change of the operating potential, the step switch of the pulse height discriminator, the quenching device of the electronic counter, etc.

According to a practical example, using a stylus for the charging of the partial capacities spaced from the surface of the electrodes, and assuming a smallest linear dimension of the particle image of 0.5 mm. and a maximum dimension of 5 mm., the following constructional and operational data have been found to provide satisfactory results:

Distance of the electrode 5 from the surface of
 the image electrodes _____mm__  0.3
Operating voltage with respect to ground __volts__ 2200
Capacitance of capacitor C _____mmfd__ 2500
Resistance of resistor R _____ohms__ 1000
Speed of revolution of disk 4 _____r.p.m__ 120

With an outer diameter of the image capacitor of 150 mm. and the number of partial images being about 5000, counting could be achieved in about 45 seconds.

As pointed out, it is also possible to effect the charging of the partial capacitors by direct conductive contact of the scanning electrode 5 with the areas 3, as will be further described in the following.

As can readily be seen, where the electrode 5 scans a particle, such as 3', twice or more times during successive turns of the disk 4, no multiple charging pulses will be produced on account of the retention of the initial charge applied during the first scan, whereby to prevent counting errors, especially in the case of irregular particles or particles of relatively large size or area, as will be readily understood. In this manner, counting errors are substantially eliminated or minimized by the invention.

It has been found when using a slide wire as a scanning electrode, that the initial contact with the conducting surface of an image capacitor may not be sufficient to effect a full charge to the maximum operating voltage, on account of the fact that after the initial contact a small amount of the charge may be compensated due to polarizing effects of the insulating or dielectric layer of the image capacitor. As a consequence, the partial capacitor at a following contact of the slide wire with the same particle surface will be able to assume an additional or secondary charge, whereby, with the particle images varying largely in size or area, counting errors may occur frequently in practice. Inasmuch as the height of the secondary pulse is proportional to the initial pulse and, in turn, to the area of partial image, correction may be effected by means of a simple numerical operation.

According to a further feature of the present invention, the additional charging pulses of the image capacitors where a sliding wire is used as a scanning electrode are substantially avoided, whereby any numerical correction may be dispensed with. For this purpose, there is employed a scanning electrode in the form of an anodically oxidized slide wire of aluminum having an oxide film of such a thickness as to just cause a puncture or penetration by the operating voltage used.

More specifically, during the initial contact between the oxidized slide wire and the surface of the partial capacitor, the oxide film of the slide wire will be punctured by the operating voltage, provided the film has an appropriated thickness and porosity obtained by the use of a suitable forming process, as described in the following. The initial puncture of the film results in a charging of the partial capacitor to the full operating voltage. However, during the subsequent scanning of the same partial capacitor, additional charging will be prevented due to the fact that the difference voltage between the partial capacitor and the slide wire will be insufficient to cause a breakthrough, even though the voltage of the charged partial capacitor may have been reduced by the polarization effects mentioned previously. An essential prerequisite for the proper functioning is, therefore, that the oxide film upon the wire has a thickness and physical characteristic such as to just cause a puncture or breakthrough by the operating or charging voltage being used.

An oxide film suitable for the purpose of the invention may be produced, by way of example, by the anodic oxidation of an aluminum wire in a 20 percent sulfuric acid solution at room temperature, using a current density of about 0.02 amperes/cm.$^2$ during a forming period of about 30 minutes. With a slide wire thus treated, an operating voltage of from 800 to 1000 volts will result in the substantial elimination of the additional or secondary charging pulses of the image capacitors. On account of the wear caused by friction between the wire and the surface of the capacitor, it is necessary to renew the wire after every 2 hours of operation.

It has been found advisable, after the consecutive charging operation of all the partial capacitors of an image capacitor during an analysing cycle, to effect a discharge not by means of the oxidized wire used during the charging, but rather by means of a separate sliding wire or loop consisting of a bare inert or precious metal. The alternate withdrawal and application of the two sliding wires or scanning electrodes may be effected in a simple manner by the aid of a toggle or the like mechanism controlled by means of suitable positioning or adjustable stop means, in the manner described in greater detail hereafter. Such an arrangement utilizing separate sliding electrodes for the charging and discharging of the partial capacitors has the advantage that, after the complete discharge of the capacitors by the bare wire or electrode, sharply defined charging pulses will be ensured during a subsequent scanning operation and that, furthermore, the possibility of the accumulation of undesirable dirt and dust deposits upon the charging wire is greatly reduced thereby or minimized. Moreover, the life of the oxidized aluminum wire is increased or doubled in this manner.

An essential simplification in the carrying out of the method with the assurance of an undamaged oxide film at all times upon the slide wire may be furthermore achieved by the provision of an arrangement for the automatic renewal of the wire from a supply each time after the termination of a charging operation or cycle. Such an automatic renewal greatly reduces the requirements for attendance and supervision of the scanning operation. Besides, there is obtained thereby a further increase of the counting accuracy, inasmuch as the accumulation of dust and dirt between the wire and the surface of the capacitors is substantially avoided by the periodic renewal of the scanning surface. Finally, the uniformity of the oxide film during the charging of the entire image capacitor results in substantially equal amplitudes of the charging pulses for partial images of equal size or area.

For the purpose of automatically renewing the sliding wire, the device may contain, for instance, a few meters of oxidized aluminum wire having an outer diameter of 0.08 mm. with the feeding of the wire being advantageously effected by means of a ratchet or the like mechanism in cooperation with suitable stop means, as described in greater detail in the following.

FIG. 2A illustrates, by way of example, one method of preparing an image capacitor for use in connection with the invention. The base electrode 1 carrying the insulating or dielectric layer 2 has applied to it a water-soluble light-sensitive layer *a* which is exposed by means of a photographic copy *b* of the particle aggregate according to contact printing method, as illustrated, or by projection printing, the exposing light rays being indicated by the arrows L in the drawing. As a consequence, the areas of the layer *a* impinged by the exposing light rays will be hardened such as to prevent their removal during a subsequent rinsing or washing treatment. The remaining areas forming a replica of the particle image are then coated with a conductive substance, such as a metal solution, in the manner described hereinbefore.

An alternative method is shown in FIG. 2B utilizing a photographic etching process well known in the production of printed electrical circuits. Again, the base 1 is coated with a dielectric layer 2 in the form of a glass or polystyrol film, an anodized or oxide coating or the like. The layer 2, in this case, is coated with a layer *c* of conducting material, preferably copper, applied by means of a chemical, evaporation or the like coating process well known in the art. A light-sensitive layer *a* is then deposited upon the layer *c* and the positive or negative particle image *b* (depending on the process used) is photographically reproduced in the layer *a* by a process similar to the development of a photographic film, whereupon the non-illuminated areas are washed off the light-sensitive surface and the resultant picture fixed in the manner also customary in photography. The remaining fixed areas of the layer *c* are resistant to an etching acid to which the device is then subjected, whereby to permit the unprotected areas of the layer *c* to be etched away and to leave the remaining conductive material in the configuration of the original particle aggregate, in a manner readily understood. There are numerous other processes of producing a capacitative image from a photographic image for the purposes of the present invention which will suggest themselves to those skilled in the art.

FIGS. 3 and 4 show in greater detail and by way of example the construction of a scanning head for use in connection with an arrangement according to FIG. 1, including means for the automatic renewal of the sliding wire scanning electrode at the end of a scanning operation or cycle.

The scanning head comprising the travelling nut 11 of insulating material, such as a plastic or the like, is displaced radially by the aid of the lead screw 12 and guide rods 13, in a manner readily understood. Numeral 14 denotes a first support or plate fixedly secured to the nut 11 and having rotatably connected thereto by means of a hinge 16 a second support or plate 15 which latter may be swung from a normally horizontal to an inclined position of about 30°. The screw 12 and the guides 13 are suitably mounted above the image capacitor to be analysed (not shown) for radial displacement in both inward and outward directions, as indicated by the arrows *o* and *p*, respectively.

Mounted upon the plate 15 in juxtaposed relation and upon a common axis 20*a* are a wire supply spool 17 and a take-up spool 18 both being rotatable independently one of the other. The take-up spool 18 is secured to a ratchet wheel 19 cooperating with a pawl or lever 20 mounted upon plate 15 and urged in anticlockwise direction by a chain 20*b*. With the lever 20 engaging at point X the stationary stop 21 defining the inner end position of the scanning head, the ratchet 19 together with the feed spool 18 will be rotated in counterclockwise direction by one tooth length and arrested in this position by the blocking spring or lever 22, FIG. 4.

The oxidized aluminum wire 23 wound upon the supply spool 17 is passed through a pair of guide tubes 24 and 25 unto the take-up spool 18. At the point of transition from the tube 24 to the tube 25 the wire 23 forms a loop 23′ serving as scanning electrode during the charging of the image capacitor, that is, with the scanning head moving towards the center of the capacitor (arrow *o*) in the example shown and described. During this time, the plate 14 and with it the loop 23′ are connected to the high tension pole of the operating voltage source through a flexible lead or the like (not shown), to produce a series of charging current pulses in the scanning circuit, in the manner described hereinbefore.

Upon the scanning head reaching the innermost position defined by the stop 21, corresponding to the position of the loop 23′ at the center of the image capacitor, the wire 23 in the tube 25 will be pulled upwards by the ratchet 19 rotated by one tooth as described, whereby to withdraw the loop 23′ from the surface of the image capacitor. At the same time, a further lever 26 is deflected in the downward direction by its point Y engaging the further stationary stop 27. The opposite end of the lever 26 carries a wire loop 28 consisting of bare inert or precious metal. Loop 28 in the lowered position of the lever 26 engages the surface of the mosaic capacitor in place of the loop 23′, the latter having been lifted previously as pointed out. During the subsequent discharging operation of the capacitor by the scanning head moving in the outward direction (arrow *p*), upon reversal of the direction of rotation (arrow *n*) of the feed screw 12, the plate 15 and with it the blank wire loop 28 are connected to ground by means of a suitable switching device, such as a microswitch (not shown), to effect a discharge of the image capacitors, in the manner described hereinbefore.

Upon reaching the outer limit position of the scanning head at the end of a discharging operation, the plate 15 by engaging a positioning roller 29 is rotated in clockwise direction, as indicated by the arrow *g*. As a consequence, a rod 31 urged in the upward direction by a spring 30 is caused to move downwardly relative to the plate 15, whereby to lower the wire loop 23′ by the lateral extension 31′ of the rod 31 engaging said loop and to thereby withdraw a short length of wire from the supply spool 17. In order to urge the rod in the downward direction during the raising of the plate 15, it carries as its upper end a roller 32 engaging a stationary slanting guide 44 secured to plate 14. A groove in the guide 33 serves to prevent rotation of the rod 31.

Simultaneously with the upward movement of the plate 15, a hook 34 connected to said plate engages and lifts the lever 26 being held or arrested in its upper position by a suitable snap holder, catch or the like. As a consequence, the bare wire loop 28 no longer engages the surface of the mosaic capacitor, whereby to enable the device to commence a renewed scanning operation after change of the direction of rotation (arrow *n*) of the feed screw 12. There is thus produced by the proper design of the operating strokes of the lever 26 and rod 31, indicated by the double arrows *r* and *s* in the drawing, an alternate interchange between the bare and anodized scanning wires for the discharge and charging, respectively, of the elemental image capacitors, while at the same time renewing the scanning point of the anodized wire prior to each new charging or analysing cycle.

During the initial scanning movement, the slanting surface of the plate 15 gradually slides off the roller 29, whereby the previously renewed scanning wire or loop 23′ again engages the surface of the image capacitor, while at the same time the electrode is connected to the high voltage pole of the operating source.

The guide tubes 24 and 25 for the wire 23 are advantageously provided with notches or indentations for the mounting of a rubber ring or the like retainer 35, said ring resiliently engaging the wire passing through the tubes and serving as a means to secure the loop 23′ against upward displacement upon engaging the surface of the capacitor.

In the foregoing the invention has been described with

I claim:

1. Apparatus for electronically analysing a particle aggregate of widely varying particle size and constituted by a mosaic capacitor composed of a large-surface conducting base electrode, a highly insulating dielectric layer of uniform thickness overlying said base electrode and a multiplicity of discrete mutually spaced mosaic electrodes overlying said dielectric layer and forming with said base electrode and dielectric layer a multiplicity of capacitor elements providing a replica as to size, configuration and spacing of the particles of the aggregate to be analysed, said apparatus comprising in combination:
    (1) a first large-surface conducting support movable along a first scanning trace and adapted for mounting thereon a capacitor to be analysed with its base electrode in electrical and mechanical connection with said support,
    (2) a second support movable along a second scanning trace coordinated with said first trace,
    (3) a conducting scanning stylus carried by said second support in effective current pickup relation to said mosaic electrodes in the mounted position of said capacitor,
    (4) an electric circuit including a source of substantially constant direct current voltage connected to said first support and said stylus, and
    (5) operating mechanism to simultaneously displace said first and second supports along said first and second scanning traces, respectively, to consecutively scan said mosaic electrodes by said stylus, said source having a voltage such as to produce a charging current flow between said stylus and said first support, said current flow resulting in a pulse sequence in said circuit with the number of pulses thereof corresponding to the number of mosaic electrodes scanned and with the height of the pulses being proportional to the size of the respective electrodes, substantially independently of the relative size and configuration of said electrodes.

2. In particle aggregate analysing apparatus as claimed in claim 1, said stylus arranged to be in direct contact with said mosaic electrodes in the mounted position of said capacitor and consisting of an anodized slide wire having an oxide coating of a thickness to cause a puncture thereof by said voltage.

3. In particle aggregate analysing apparatus as claimed in claim 1, said scanning stylus being constituted by the apex of a triangular loop formed by an anodized wire arranged to be unwound from a supply spool and being wound upon a take-up spool, and means to intermittently unwind said wire from said supply spool unto said take-up spool by predetermined lengths, to renew the apex scanning area of said loop.

4. In particle aggregate analysing apparatus as claimed in claim 1, including a coupling network in said circuit comprised of a series capacitor having a capacitance being large in comparison with the capacitance of the largest capacitor element to be scanned, and a resistance shunting said series capacitor.

5. In particle aggregate analysing apparatus as claimed in claim 1, including a pulse height discriminator followed by an electronic pulse counter, and an R-C parallel network coupling said circuit with said discriminator, the capacitor of said network having a capacitance being large in comparison to the capacitance of the largest capacitor element to be scanned.

6. Apparatus for electronically analysing a particle aggregate of widely varying particle size and configuration and constituted by a mosaic capacitor composed of a large-surface conducting base electrode, a highly insulating dielectric layer of uniform thickness overlying said base electrode and a multiplicity of discrete and mutually spaced mosaic electrodes overlying said dielectric layer and forming with said dielectric layer and said base electrode a multiplicity of capacitor elements providing a replica as to size, configuration and spacing of the particles of the aggregate to be analysed, said apparatus comprising in combination:
    (1) a first rotary large-surface conducting support adapted for mounting thereon a mosaic capacitor to be analysed with its base electrode in electrical and mechanical connection with said support,
    (2) a second support radially displaceable in respect to the rotary axis of said first support,
    (3) a conducting stylus carried by said second support in effective current pickup relation to said mosaic electrodes in the mounted position of said capacitor,
    (4) an electric circuit including a source of substantially constant direct current voltage connected to said first support and said stylus, and
    (5) means to simultaneously rotate said first support and to radially displace said second support, to consecutively scan said mosaic electrodes by said stylus, said source having a voltage such as to produce a charging current flow between said stylus and said first support, said current flow resulting in a pulse sequence in said circuit with the number of pulses thereof corresponding to the number of mosaic electrodes scanned and with the height of the pulses being proportional to the size of the respective electrodes, substantially independent of the relative size and configuration of said electrodes.

7. In particle aggregate analysing apparatus as claimed in claim 6, further means to reverse the direction of radial displacement of said stylus, for discharging said mosaic electrodes prior to the starting of a new scanning operation.

8. In particle aggregate analysing apparatus as claimed in claim 7, said scanning stylus consisting of an anodized wire, a separate discharging electrode consisting of a non-anodized plain metal, and means to operate said stylus from operative position with said electrodes to a retracted position, and vice versa, in its extreme central and outer scanning positions, respectively, relative to said capacitor.

9. In particle aggregate analysing apparatus as claimed in claim 8, said scanning stylus being constituted by the apex of a triangular loop formed by an anodized wire arranged to be unwound from a supply spool and wound upon a take-up spool, and means to intermittently unwind said wire from said supply spool unto said take-up spool by predetermined lengths upon return of said loop from its retracted to its operative position, to renew the apex scanning area of said loop.

References Cited by the Examiner

UNITED STATES PATENTS

| 2,485,567 | 10/1949 | Clark. | |
| 2,602,836 | 7/1952 | Foster | 324—77 |
| 2,731,520 | 1/1956 | Richardson | 324—71 X |
| 2,745,985 | 5/1956 | Lewis | 324—77 X |
| 2,829,825 | 4/1958 | Doll. | |
| 2,941,144 | 6/1960 | Cannon | 324—54 |
| 2,942,248 | 6/1960 | Huggins | 324—54 X |
| 2,978,636 | 4/1961 | Fountain | 324—54 |

WALTER L. CARLSON, *Primary Examiner.*

CLAUDE A. S. HAMRICK, EDWARD D. KUBASIEWICZ, *Assistant Examiners.*